United States Patent
Miyano

(10) Patent No.: US 9,911,053 B2
(45) Date of Patent: Mar. 6, 2018

(54) INFORMATION PROCESSING APPARATUS, METHOD FOR TRACKING OBJECT AND PROGRAM STORAGE MEDIUM

(75) Inventor: Hiroyoshi Miyano, Tokyo (JP)

(73) Assignee: NEC Corporation, Tokyo (JP)

( * ) Notice: Subject to any disclaimer, the term of this patent is extended or adjusted under 35 U.S.C. 154(b) by 497 days.

(21) Appl. No.: 14/233,079

(22) PCT Filed: Jul. 18, 2012

(86) PCT No.: PCT/JP2012/068745
§ 371 (c)(1),
(2), (4) Date: Jan. 15, 2014

(87) PCT Pub. No.: WO2013/012091
PCT Pub. Date: Jan. 24, 2013

(65) Prior Publication Data
US 2014/0161319 A1    Jun. 12, 2014

(30) Foreign Application Priority Data

Jul. 19, 2011   (JP) .................................. 2011-158340

(51) Int. Cl.
*G06T 7/00* (2017.01)
*G06K 9/00* (2006.01)
(Continued)

(52) U.S. Cl.
CPC ..... *G06K 9/00993* (2013.01); *G06K 9/00362* (2013.01); *G06K 9/00624* (2013.01);
(Continued)

(58) Field of Classification Search
CPC .................... G06T 7/248; G06T 7/194; G06T 2207/20224; G06T 2207/10016; G06K 9/00624; G06K 9/00362; G06K 9/00993
See application file for complete search history.

(56) References Cited

U.S. PATENT DOCUMENTS 5,734,740 A * 3/1998 Benn ..................... G06T 7/0012
382/132
6,256,624 B1 * 7/2001 Pollard ..................... G06F 7/08
(Continued)

FOREIGN PATENT DOCUMENTS

| JP | 2007-272436 A | 10/2007 |
|---|---|---|
| JP | 2007-310480 A | 11/2007 |
| JP | 2010-257441 A | 11/2010 |

OTHER PUBLICATIONS

Breitenstein, et al., "Robust Tracking-by-Detection using a Detector Confidence Particle Filter", IEEE 12th International Conference on Computer Vision, Sep. 2009, pp. 1515-1522.
(Continued)

*Primary Examiner* — Iman K Kholdebarin
(74) *Attorney, Agent, or Firm* — Wilmer Cutler Pickering Hale and Dorr LLP

(57) ABSTRACT

Provided is a technology which enables early removal from a tracking target of an object unnecessary to be tracked and which, together therewith, when the tracking target is temporarily in a state of being not detected, enables continuous tracking of the relevant tracking target without removing it from the tracking target.

A detection unit 2 detects, as a tracking candidate, an object included in an image by using image processing. A corresponding degree calculation unit 3 calculates a corresponding degree which is index representing a probability that the detected tracking candidate corresponds to the tracking target registered as an object to be tracked. When having determined that it is unnecessary to track the tracking target based on an evaluation value calculated by using the corresponding degree, a decision unit 4 deletes the registration of the object to be tracked with respect to the relevant tracking target.

9 Claims, 7 Drawing Sheets

(51) Int. Cl.
*G06T 7/246* (2017.01)
*G06T 7/194* (2017.01)
(52) U.S. Cl.
CPC ............... *G06T 7/194* (2017.01); *G06T 7/248* (2017.01); *G06T 2207/10016* (2013.01); *G06T 2207/20224* (2013.01)

(56) References Cited

U.S. PATENT DOCUMENTS

| | | | |
|---|---|---|---|
| 6,590,999 B1* | 7/2003 | Comaniciu | G06K 9/32 348/416.1 |
| 8,320,644 B2* | 11/2012 | Singer | G06F 17/30265 382/100 |
| 8,457,466 B1* | 6/2013 | Sharma | G06F 17/30784 386/224 |
| 8,570,371 B2* | 10/2013 | Yamashita | G06T 7/248 348/135 |
| 8,971,575 B2* | 3/2015 | Chang | G06T 7/277 382/100 |
| 8,989,438 B2* | 3/2015 | Moriguchi | 382/103 |
| 8,989,501 B2* | 3/2015 | Buehler | G06T 7/20 382/191 |
| 9,064,302 B2* | 6/2015 | Muraoka | A61B 6/5217 |
| 9,317,772 B2* | 4/2016 | Shellshear | G06K 9/4647 |
| 9,442,485 B1* | 9/2016 | McDermott | G05D 1/0094 |
| 9,576,204 B2* | 2/2017 | Goldner | G06K 9/00778 |
| 2003/0169943 A1* | 9/2003 | Stanek | G01S 13/726 382/278 |
| 2004/0096083 A1* | 5/2004 | Matsunaga | B25J 5/00 382/104 |
| 2004/0170327 A1* | 9/2004 | Kim | G06F 17/30259 382/217 |
| 2004/0170394 A1* | 9/2004 | Kiyama | G11B 20/10 386/248 |
| 2005/0031166 A1* | 2/2005 | Fujimura | G06K 9/00369 382/103 |
| 2005/0129311 A1* | 6/2005 | Haynes | G06K 9/00248 382/170 |
| 2006/0078230 A1* | 4/2006 | Kimura | H04N 1/2112 382/309 |
| 2006/0256130 A1* | 11/2006 | Gonzalez | G06F 17/3089 345/619 |
| 2008/0108873 A1* | 5/2008 | Gattani | H04N 5/23296 600/168 |
| 2008/0304706 A1* | 12/2008 | Akisada | G06K 9/00771 382/103 |
| 2009/0022368 A1* | 1/2009 | Matsuoka | B60K 35/00 382/103 |
| 2009/0037486 A1* | 2/2009 | Ozawa | G06F 21/6218 |
| 2009/0066790 A1* | 3/2009 | Hammadou | G08B 13/19636 348/143 |
| 2009/0226037 A1* | 9/2009 | Yang | G06K 9/00369 382/103 |
| 2010/0053151 A1* | 3/2010 | Marti | G06F 3/011 345/419 |
| 2011/0013840 A1* | 1/2011 | Iwasaki | G06T 7/215 382/173 |
| 2011/0029278 A1* | 2/2011 | Tanigawa | G01S 5/0294 702/150 |
| 2011/0081089 A1* | 4/2011 | Mori | G06K 9/00281 382/218 |
| 2011/0135149 A1* | 6/2011 | Gefen | G01S 3/7864 382/103 |
| 2011/0135158 A1* | 6/2011 | Nishino | G06T 7/2066 382/107 |
| 2011/0276984 A1* | 11/2011 | Wagner | G06F 8/436 719/317 |
| 2012/0148102 A1* | 6/2012 | Moriguchi | G06T 7/208 382/103 |
| 2012/0253170 A1* | 10/2012 | Kim | A61B 34/10 600/410 |
| 2013/0010154 A1* | 1/2013 | Maeda | G06F 17/30259 348/222.1 |
| 2013/0121535 A1* | 5/2013 | Matsukawa | G06K 9/3233 382/103 |
| 2013/0136306 A1* | 5/2013 | Li | G02B 27/28 382/103 |
| 2013/0136313 A1* | 5/2013 | Maeda | G06K 9/00577 382/111 |
| 2013/0236098 A1* | 9/2013 | Fujisaki | G06T 7/0081 382/171 |
| 2013/0265412 A1* | 10/2013 | Abe | G06T 7/0004 348/95 |
| 2013/0287250 A1* | 10/2013 | Lee | G06K 9/00362 382/103 |
| 2013/0335635 A1* | 12/2013 | Ghanem | G01S 3/7865 348/659 |
| 2014/0022394 A1* | 1/2014 | Bae | G06K 9/00771 348/169 |
| 2014/0219504 A1* | 8/2014 | Haraguchi | G06K 9/00369 382/103 |
| 2014/0226877 A1* | 8/2014 | Je | G06K 9/00288 382/118 |
| 2014/0328512 A1* | 11/2014 | Gurwicz | G06K 9/00771 382/103 |
| 2014/0341474 A1* | 11/2014 | Dollar | G06K 9/00711 382/197 |
| 2015/0016798 A1* | 1/2015 | Fujimatsu | G06K 9/00362 386/223 |
| 2015/0051617 A1* | 2/2015 | Takemura | A61B 6/12 606/130 |
| 2015/0178931 A1* | 6/2015 | Gao | G06F 17/2765 382/103 |
| 2015/0199590 A1* | 7/2015 | Yaguchi | G06K 9/4604 382/195 |
| 2015/0220781 A1* | 8/2015 | Ozaki | G06T 3/0062 382/103 |
| 2015/0262019 A1* | 9/2015 | Miyano | G06K 9/00362 382/103 |
| 2016/0117840 A1* | 4/2016 | Yamamoto | G06K 9/6212 382/103 |
| 2016/0350938 A1* | 12/2016 | Maltese | G06T 7/208 |

OTHER PUBLICATIONS

Dalal, et al., "Histograms of oriented gradients for human detection", 2005 IEEE Computer Society Conference on Computer Vision and Pattern Recognition (CVPR 2005) and Jun. 2005, vol. 1, pp. 886-893.
International Search Report corresponding to International Application No. PCT/JP2012/068745, dated Oct. 11, 2012, 3 pages.
Jaward, et al., "Multiple Object Tracking Using Particle Filters" 2006 IEEE Aerospace Conference (2006), pp. 1-8.
Tanaka, et al. "Dynamic Background Model Establishment in view of Time-Space Feature and Object Detection based thereon", Meeting on Image Recognition and Understanding (MIRU2009), collected papers, Jul. 2009, pp. 127-134.

* cited by examiner

# INFORMATION PROCESSING APPARATUS, METHOD FOR TRACKING OBJECT AND PROGRAM STORAGE MEDIUM

CROSS-REFERENCE TO RELATED APPLICATIONS

This application is a national stage application of International Application No. PCT/JP2012/068745 entitled "Information Processing Apparatus, Object Tracking Method, And Program Storage Medium," filed on Jul. 18, 2012, which claims the benefit of the priority of Japanese Patent Application No. 2011-158340, filed on Jul. 19, 2011, the disclosures of each of which are hereby incorporated by reference in their entirety.

TECHNICAL FIELD

The present invention relates to a technology for tracking a moving object in a moving image.

BACKGROUND ART

In NPL 1, there is disclosed a technology which, through using a background differencing technique for removing a preliminarily given background image from a moving image photographed by a video camera or the like, enables detection of moving objects (for example, persons and vehicles) included in the moving image.

Further, in NPL 2, there is disclosed a technology which enables detection of moving objects included in a moving image. In this technology disclosed in NPL 2, a large amount of information related to objects to be tracked are collected. Learning (mechanical learning) is performed based on the collected information. And a moving object included in the moving image is detected by using the result of the learning.

Moreover, in each of PTL 1, NPL 3 and NPL 4, there is disclosed a technology for tracking a moving object having been detected in a moving image. Further, in each of PTL 1 and NPL 3, there is disclosed a technology described below. In this technology, an object (a person candidate) regarded as a person is detected by performing image processing (person detection processing) on a moving image. In the case where the detected person candidate is not yet registered as a target for tracking (a tracking target), the unregistered person candidate is newly registered as the tracking target. Furthermore, in each of PTL 1 and NPL 3, there is disclosed a technology in which, although a person of interest is a person targeted for tracking, when the person of interest cannot be detected continuously a predetermined number of times by means of the person detection processing, the person of interest who could not be detected is removed from the tracking target.

CITATION LIST

Patent Literature

[PTL 1] Japanese Patent Application Laid-Open No. 2010-257441

Non Patent Literature

[NPL 1] Tatsuya Tanaka, Atsushi Shimada, Rin-ichiro Taniguchi, Takayoshi Yamashita, Daisaku Arita, "Dynamic Background Model Establishment in view of Time-Space Feature and Object Detection based thereon", Meeting on Image Recognition and Understanding (MIRU2009), collected papers, July 2009, pp. 127-134

[NPL 2] The Dalal, N., the Triggs, B., "Histograms of oriented gradients for human detection", 2005 IEEE Computer Society Conference on Computer Vision and Pattern Recognition (CVPR 2005) and June 2005, Vol. 1, pp. 886-893

[NPL 3] Michael D. Breitenstein, Fabian Reichlin, Bastian Leive, Esther Koller-Meier and Luc Van Gool and "Robust Tracking-by-Detection using a Detector Confidence Particle Filter", IEEE 12th International Conference on Computer Vision, September 2009, pp. 1515-1522

[NPL 4] M. Jaward, L. Mihaylova, N. Canagarajah, and D. Bull and "Multiple Object Tracking Using Particle Filters" 2006 IEEE Aerospace Conference (2006)

SUMMARY OF INVENTION

Technical Problem

Meanwhile, when a computer is tracking a moving object in a moving image by using one of technologies disclosed in the aforementioned literatures, there occurs a case where a moving object which has not been tracked until then newly appears in the moving image. In this case, the computer performs processing to register the moving object, which has newly appeared, as a tracking target. Nevertheless, sometimes, there occurs a case where the computer erroneously registers a new object which is not to be tracked because of a detection accuracy problem with respect to object detection processing. In this case, it is preferred that the computer early performs processing to remove the erroneously registered object from the tracking target.

Further, when the moving object which has been continuously tracked has changed to a state where the moving object is not detected in the moving image, the computer performs processing to remove from the tracking target the moving object in the state of being not detected. In this regard, there occurs a case where an object, which is a tracking target, is temporarily in a state where the object cannot be detected in the moving image, such as a case where the object is in a state of being hidden behind a different object. In such case, it is preferred that the computer continues to track the object which is temporarily in the state of being not detected without removing the object from the tracking target.

Nevertheless, in the aforementioned technologies disclosed in PTL 1 and NPL 1 to NPL 4, it is difficult to together realize both of the early removal of an erroneous registration of a tracking target object and the continuous tracking of the tracking target object which is temporarily in the state of being not detected.

The present invention has been developed in order to solve the aforementioned problem. That is, a main objective of the present invention is to provide a technology which enables early removal from the tracking target of an object unnecessary to be tracked and which, together therewith, when a tracking target object is temporarily in the state of being not detected, enables continuous tracking of the relevant tracking target object without removing it from the tracking target.

Solution to Problem

An information processing apparatus includes:
detection means for detecting an object included in an image as a tracking candidate by image processing;

corresponding degree calculation means for calculating a corresponding degree representing a probability that the tracking candidate detected by the detection means corresponds to a tracking target registered as an object to be tracked; and decision means for deleting a registration of the object to be tracked with respect to the relevant tracking target in a case of determining that it is unnecessary to track the tracking target based on an evaluation value which is calculated by using the calculated corresponding degree, and is also a value which is used to determine whether or not the relevant tracking target is needed to be tracked continuously.

A method for tracking an object, includes:

detecting, by a computer, an object included in an image as a tracking candidate by image processing;

calculating, by the computer, a corresponding degree representing a probability that the detected tracking candidate corresponds to a tracking target registered as an object to be tracked; and deleting, by the computer, a registration of the object to be tracked with respect to the relevant tracking target in a case of determining that it is unnecessary to track the tracking target based on an evaluation value which is calculated by using the calculated corresponding degree, and is also a value which is used to determine whether or not the relevant tracking target is needed to be tracked continuously.

A program storage medium storing a computer program that causes a computer to execute processing including the processes of:

detecting, by a computer, an object included in an image as a tracking candidate by image processing;

calculating, by the computer, a corresponding degree representing a probability that the detected tracking candidate corresponds to a tracking target registered as an object to be tracked; and deleting, by the computer, a registration of the object to be tracked with respect to the relevant tracking target in a case of determining that it is unnecessary to track the tracking target based on an evaluation value which is calculated by using the calculated corresponding degree, and is also a value which is used to determine whether or not the relevant tracking target is needed to be tracked continuously.

Advantageous Effects of Invention

According to the present invention, it is possible to early remove from a tracking target of an object unnecessary to be tracked and, together therewith, it is possible to, when a tracking target object is temporarily in a state of being not detected, continuously track the relevant tracking target object without removing it from the tracking target.

DESCRIPTION OF EMBODIMENTS

Hereinafter, exemplary embodiments according to the present invention will be described with reference to the drawings.

(First Exemplary Embodiment)

A first exemplary embodiment according to the present invention will be described.

Figure 1:
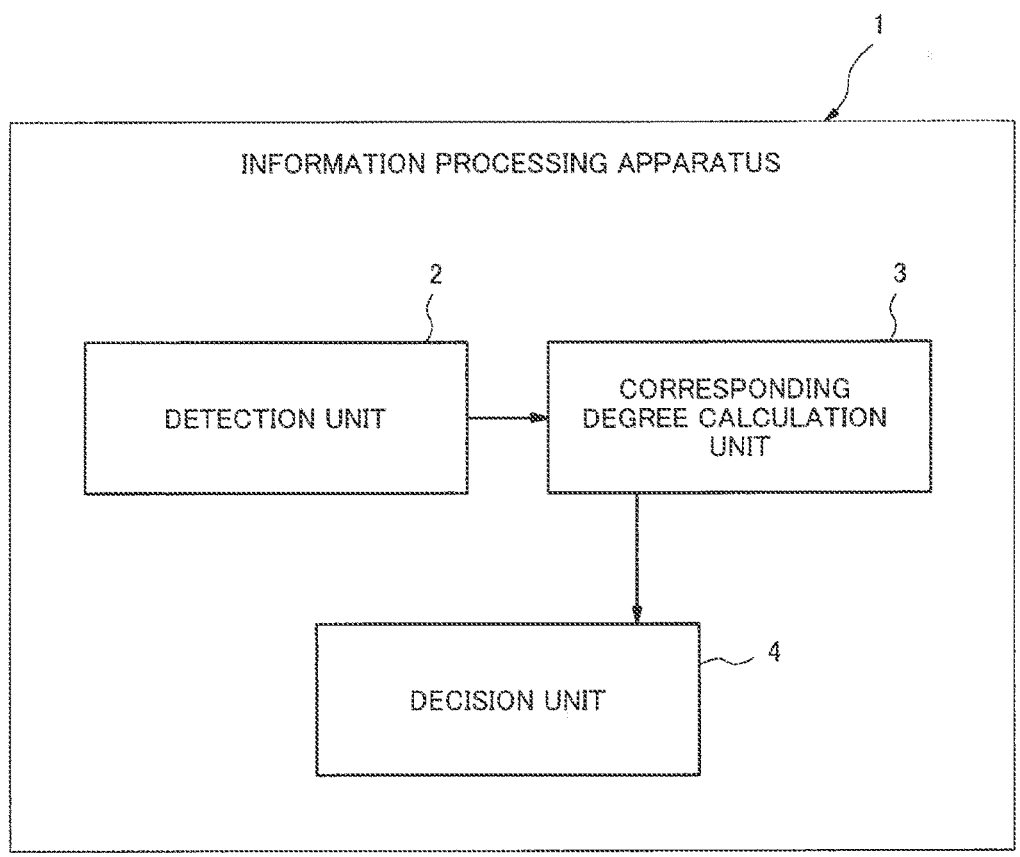
FIG. 1 is a block diagram illustrating a simplified configuration of an information processing apparatus according to a first exemplary embodiment of the present invention.

FIG. 1 is a block diagram illustrating a simplified configuration of an information processing apparatus according to this first exemplary embodiment of the present invention. The information processing apparatus 1 of this first exemplary embodiment includes a detection unit (detection means) 2, a corresponding degree calculation unit (corresponding degree calculation means) 3 and a decision unit (decision means) 4. The detection unit 2 detects, as a tracking candidate, an object included in an image by using image processing. The corresponding degree calculation unit 3 calculates a corresponding degree. The corresponding degree is index representing a probability that the tracking candidate detected corresponds to a tracking target registered as an object to be tracked.

When having determined that it is unnecessary to track the tracking target based on an evaluation value, the decision unit 4 deletes a registration of the object to be tracked with respect to the relevant tracking target. The evaluation value is a value which is calculated by using the calculated corresponding degree, and is also a value which is used to determine whether or not the relevant tracking target is needed to be tracked continuously.

The information processing apparatus 1 of this first exemplary embodiment is configured in such a way as described above, and thus, enables early removal from the tracking target of an object unnecessary to be tracked. Together therewith, when a tracking target object is temporarily in a state of being not detected, the information processing apparatus 1 enables continuous tracking of the relevant tracking target object without removing it from the tracking target.

(Second Exemplary Embodiment)

Hereinafter, a second exemplary embodiment according to the present invention will be described.

Figure 2:
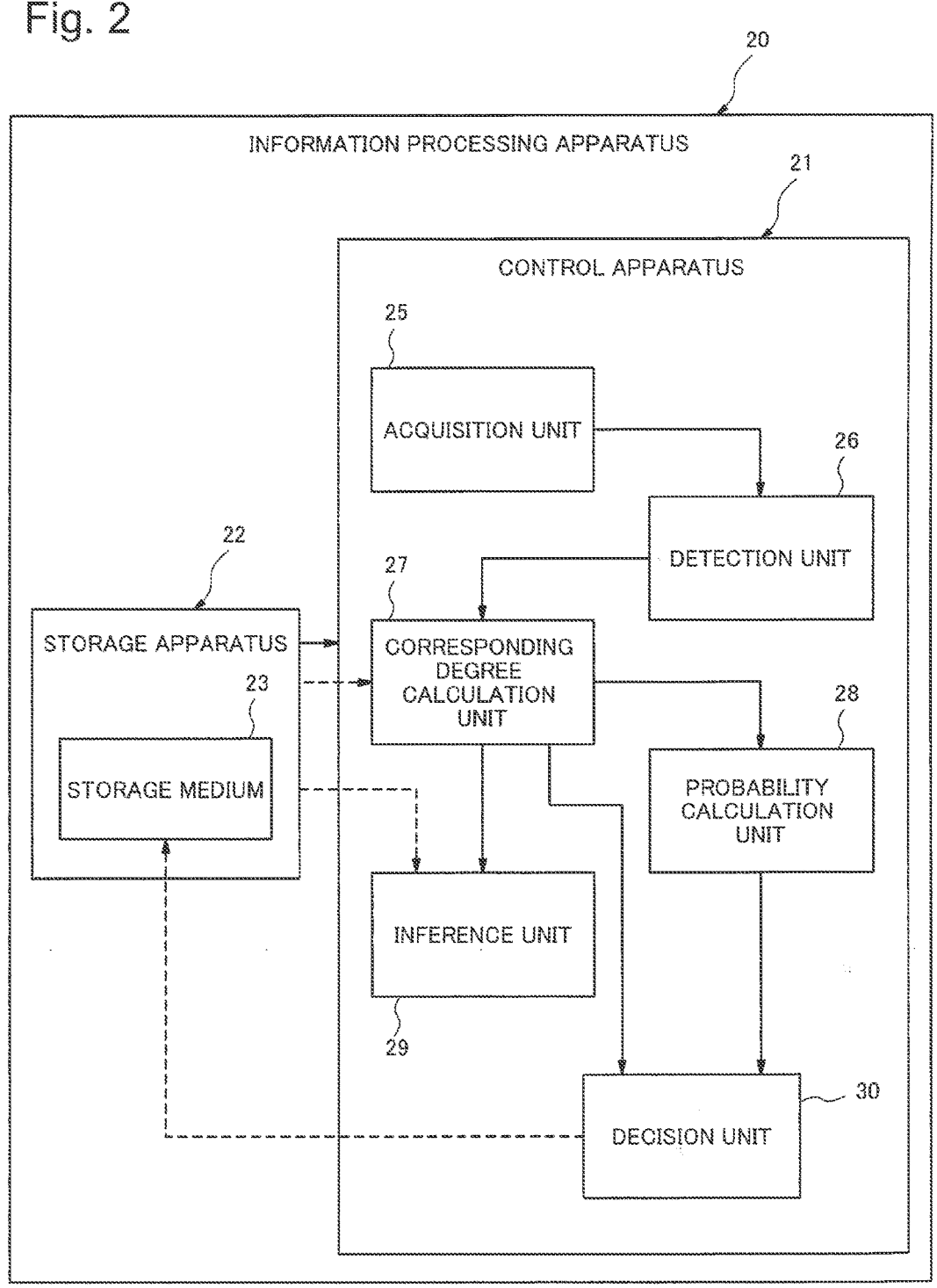
FIG. 2 is a block diagram illustrating a simplified configuration of an information processing apparatus according to a second exemplary embodiment of the present invention.

FIG. 2 is a block diagram illustrating an outline of a configuration of an information processing apparatus according to this second exemplary embodiment of the present invention. The information processing apparatus 20 of this second exemplary embodiment includes a control apparatus 21 and a storage apparatus 22. The storage apparatus 22 is, for example, a hard disk apparatus. The storage apparatus 22 includes a storage medium 23. The storage medium 23 stores therein a computer program (a program), which represents various process procedures for the information processing apparatus 20, and data. In addition, there is a case where the above computer program is stored in a portable storage medium. In this case, for example, the above computer program is written into the storage medium 23 of the storage apparatus 22 from the portable storage medium.

The control apparatus 21 is constituted of, for example, a central processing unit (CPU). The control apparatus (CPU) 21 reads out and executes the computer program stored in the storage apparatus 22 (the storage medium 23), and thereby performs control of the entire processing of the information processing apparatus 20. More specifically, in this second exemplary embodiment, through executing the computer program stored in the storage apparatus 22, the control apparatus (CPU) 21 performs the following functions. That is, the control apparatus 21 includes, as function units, an acquisition unit 25, a detection unit (detection means) 26, a corresponding degree calculation unit (corresponding degree calculation means) 27, a probability calculation unit 28, an inference unit 29 and a decision unit (decision means) 30.

The acquisition unit 25 includes a function of acquiring an image from a moving image having been photographed by a video camera or the like at each of intervals of a predetermined period of time (or at each of predetermined times of a day).

The detection unit 26 includes a function of detecting (extracting) a candidate for an object to be tracked (hereinafter, which will be also referred to as a tracking candidate) by performing image processing, in the image (the image targeted for processing) acquired by the acquisition unit 25. There are various proposals in a method for image processing (object detection processing) to detect the tracking candidate. For example, there exists object detection processing using a background differencing technique, such as disclosed in NPL 1. Further, there exists object detection processing using a result of learning (mechanical learning) on a target to be tracked (hereinafter, which will be also referred to as a tracking target), such as disclosed in NPL 2. In this second exemplary embodiment, any object detection processing may be employed as object detection processing to use in the detection unit 26.

In addition, when the tracking candidate has been detected in the image (the image targeted for processing), a mark is appended to an area at which the tracking candidate (detected object) has been detected. As this mark, sometimes, a mark of a rectangular shape is used, but the shape of the mark is not limited to the rectangular shape, and may be, for example, an elliptical shape or a more complicated shape.

The corresponding degree calculation unit 27 includes a function of calculating a corresponding degree. This corresponding degree means information representing a degree of a possibility that the tracking candidate (detected objects) detected by the detection unit 26 is the existing tracking target (that is, the corresponding degree means a correspondence probability that a tracking candidate corresponds to the existing tracking target). An example of a method for calculating this corresponding degree (correspondence probability) is disclosed in NPL 4. In NPL 4, a corresponding degree $\beta_{km}$ is calculated by using a formula (1). In addition, information related to the tracking target is stored in the storage apparatus 22 or a memory device other than the storage apparatus 22 by the decision unit 30. In addition, there are various kinds of memory device, and, here, a suitable kind of memory device is provided at an appropriate position.

$$\beta_{km} = \sum_{\theta \in \Theta_{km}} P(\theta) \qquad (1)$$

Where the probability $\beta_{km}$ in the formula (1) represents a probability in the case where a k-th tracking target corresponds to a m-th tracking candidate. That is, each of tracking targets is given a sign for identifying the relevant tracking target. For example, in the case where a plurality of tracking targets whose total number is K is set, each of the tracking targets is given an integer k (k=1, . . . , or K) of mutually different integers whose total number is K. Similarly, each of tracking candidates is also given a sign for identifying the relevant tracking candidate. For example, when a plurality of tracking candidates whose total number is M has been detected, each of the tracking candidates is given an integer m (m=1, . . . , or M) of mutually different integers whose total number is M. In addition, there is a case where at least one of the number of the tracking targets and the number of the tracking candidates is just one.

The $P(\theta)$ in the formula (1) represents a probability that, in various assumed the correspondence relations between the tracking targets and the detected tracking candidates, a correspondence relation (a correspondence) between one of the tracking targets and one of the tracking candidates becomes a correspondence $\theta$.

Figure 4:
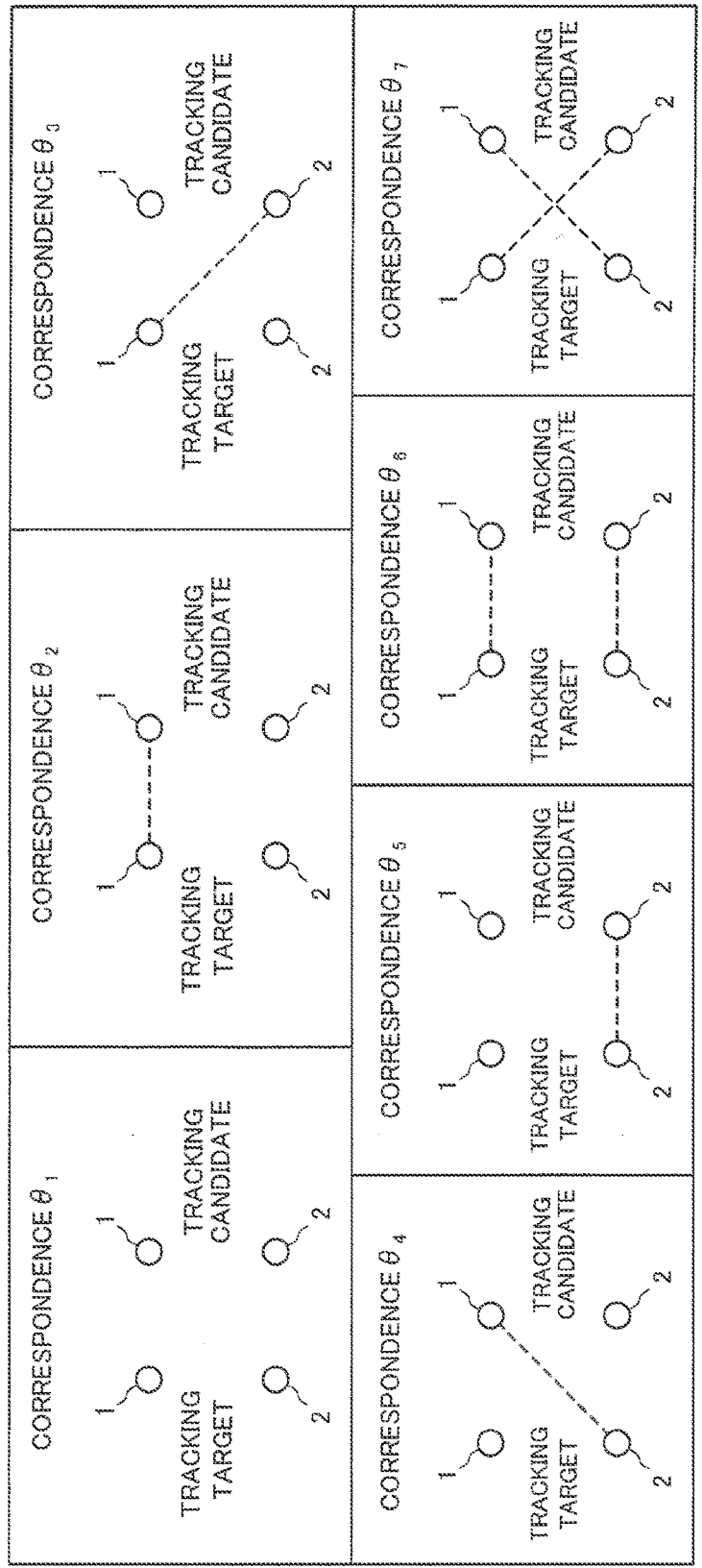
FIG. 4 is a diagram illustrating a specific example of correspondences.

Here, a specific example of the correspondence relations (the correspondences) between the tracking targets and the tracking candidates is described below. For example, it is supposed that the total number M of the tracking candidates having been detected by the detection unit 26 is two (i.e., M=2). Further, it is supposed that the total number K of the tracking targets is two (i.e., K=2). In this case, with respect to the correspondence relations (correspondences) between the tracking candidates and the tracking targets, seven cases can be considered, as shown in FIG. 4. That is, a correspondence $\theta_1$ is a case where each of tracking candidates 1 and 2 does not correspond to any of tracking targets 1 and 2. A correspondence $\theta_2$ is a case where the tracking target 1 corresponds to the tracking candidate 1, and the tracking target 2 does not correspond to the tracking candidate 2. A correspondence $\theta_3$ is a case where the tracking target 1 corresponds to the tracking candidate 2, and the tracking target 2 does not correspond to the tracking candidate 1. A correspondence $\theta_4$ is a case where the tracking target 2 corresponds to the tracking candidate 1, and the tracking target1 does not correspond to the tracking candidate 2. A correspondence $\theta_5$ is a case where the tracking target 2 corresponds to the tracking candidate 2, and the tracking target 1 does not correspond to the tracking candidate 1. A correspondence $\theta_6$ is a case where the tracking target 1 corresponds to the tracking candidate 1, and the tracking target 2 corresponds to the tracking candidate 2. A correspondence $\theta_7$ is a case where the tracking target 1 corresponds to the tracking candidate 2, and the tracking target 2 corresponds to the tracking candidate 1.

Among the above correspondences, the correspondence in which the tracking target 1 corresponds to the tracking candidate 2 are the correspondences $\theta_3$ and $\theta_7$.

The $\Theta_{km}$ in the formula (1) represents a set of correspondences in which the k-th tracking target corresponds to the m-th tracking candidate. In the specific example shown in FIG. 4, for example, a set of correspondences $\Theta_{12}$, in which the 1st (k=1) tracking target 1 corresponds to the 2nd (m=2) tracking candidate 2, includes the correspondences $\theta_3$ and $\theta_7$ (i.e., $\Theta_{12} = \{\theta_3, \theta_7\}$). Accordingly, in this case, a corresponding degree $\beta_{12}$ in the case where the 1st (k=1) tracking target 1 corresponds to the 2nd (m=2) tracking candidate 2 can be obtained by performing a calculation in accordance with a formula (2).

$$\beta_{12} = P(\theta_3) + P(\theta_7) \quad (2)$$

In this second exemplary embodiment, the P(θ) can be calculated by using an approximate calculation method described below. The method for calculating the P(θ) in this second exemplary embodiment also takes into consideration a case where the tracking target is not an object to be correctly tracked. That is, in this second exemplary embodiment, the P(θ) is calculated bas ∝ ed on a following formula (3).

P(θ)∝(a probability that, in θ, any tracking candidate (detected object) is an object to be correctly tracked)×(a probability that, in θ, any tracking candidate (detected object) is an object having been erroneously detected)×(a probability that, in θ, any tracking candidate (detected object) is an object which does not exist in reality, or is an object which exists in reality but is in the state of being not detected)×(a degree of proximity between any tracking target existing in real and the tracking candidate (detected object), in θ) . . . . (3)

A specific mathematical formula corresponding to the formula (3) can be represented by a formula (4).

$$P(\theta) \approx \prod_{m \in U(\theta)}^{N_D} P_D^m \times \prod_{m \notin U(\theta)}^{M-N_D} (1 - P_D^m) \times \prod_{k \notin V(\theta)}^{K-N_D} \{(1 - \eta_k) + \eta_k Q\} \times \prod_{\beta_{km} \in \theta} \eta_k q_{km} \quad (4)$$

Where the $\eta_k$ in the formula (4) represents a probability that the k-th tracking target is an object to be correctly tracked. Further, The U(θ) in the formula (4) represents a set of tracking candidates (detected objects) each associated with any one of tracking targets in the correspondence θ. The V(θ) represents a set of tracking targets each associated with any one of tracking candidates in a correspondence θ. The $N_D$ represents the number of tracking candidates (detected objects) each associated with any one of tracking targets in the correspondence θ. The $\epsilon_{km} \in \theta$ means that the k-th tracking target corresponds to the m-th tracking candidate (detected object) in the corresponding θ. For example, in the case where the correspondence $P(\theta_3)$ in the FIG. 4 is given as an example, the above U($\theta_3$), V($\theta_3$), $N_D$ and $\epsilon_{km} \in \theta$ in P($\theta_3$) are represented as follows: U($\theta_3$)={2}, V($\theta_3$)={1}, $N_D$=1 and $\epsilon_{12} \in \theta$.

Moreover, the $P_D^m$ in the formula (4) represents a probability that an m-th tracking candidate (detected object) is a correct answer (i.e., an object to be correctly detected). With respect to the $P_D^m$, a calculation method therefor is different depending on a detection processing method for detecting an object in an image. For example, it is supposed that a score obtained by the performing detection processing on the m-th tracking candidate (detected object) is "s". In this case, a result of learning (mechanical learning) in the object detection processing is used, and thereby a value obtained by dividing the number of detection results, each of which has the score "s" and represents a correct object, by the number of detected objects, each of which has been detected as a detected object having the score "s" through the object detection processing, is used as the $P_D^m$. Alternatively, the $P_D^m$ may be calculated by using a different probability calculation method.

Moreover, the Q in the formula (4) represents a probability that an object associated with the tracking target is not detected. With respect to the Q, for example, a result of the learning (mechanical learning) in the object detection processing is used, and thereby a value obtained by subtracting "1" from a value resulting from dividing the number of tracking candidates each representing the correct object by a total number of the correct objects may be used. Alternatively, the Q may be calculated by using a different probability calculation method.

Moreover, the $q_{km}$ in the formula (4) is a value representing a plausibility of a correspondence between the k-th tracking target and the m-th tracking candidate (detected object). In the case where, for example, a Euclidean distance with respect to positions of the k-th tracking target and the m-th tracking candidate (detected object) is denoted by "d", the $q_{km}$ can be calculated in accordance with a formula (5) using a standard deviation σ.

$$qkm = \frac{1}{\sqrt{2\pi}\,\sigma} \exp(-d^2/2\sigma^2) \quad (5)$$

Alternatively, the $q^{km}$ may be calculated by a method using proximity in a color feature, such as disclosed in NPL 4.

As shown in the formula (1), since the corresponding degree $\beta_{km}$ is $$\beta_{km} = \sum_{\theta \in \Theta_{km}} P(\theta),$$

it is necessary to take into consideration all considerable correspondences θ. The number of considerable correspondences can be obtained by using a formula (6), as described in NPL 4.

$$\sum_{N_D=0}^{min(M,K)'} \frac{M!K!}{N_D!(M-N_D)!(K-N_D)!} \quad (6)$$

Where the M represents the number of the tracking candidates (detected objects). The K represents the number of the tracking targets. The $N_D$ represents the number of the tracking candidates each associated with one of the tracking targets in a correspondence θ.

Figure 6:
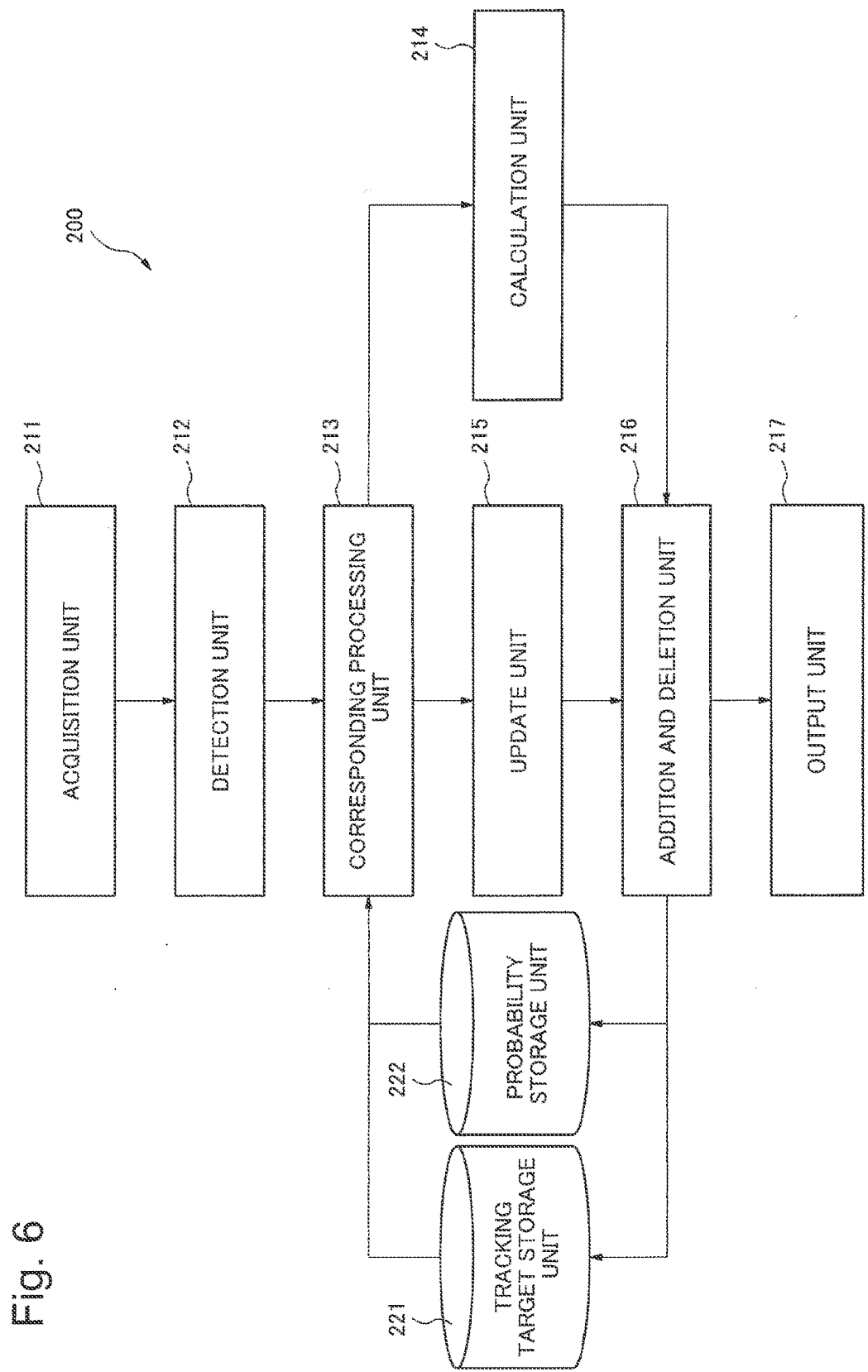
FIG. 6 is a block diagram illustrating a simplified configuration of an information processing apparatus according to a fourth exemplary embodiment of the present invention.

As easily understood from the FIG. 6 including factorial calculations, even a small increase of the M and/or the K makes the number of considerable correspondences θ to be calculated by using the formula (6) enormous. That is, even a small increase of the M and/or the K makes an amount of calculation necessary to obtain the corresponding degree $\beta_{km}$ enormous. For this reason, in order to simplify processing for calculating the corresponding degree $\beta_{km}$, only $$\partial\left(\hat{\theta} = \max_{\theta} P(\theta)\right)$$

for which P(θ) is made the highest is used, and thereby, the corresponding degree $\beta_{km}$ may be calculated by using a maximum value approximation method represented by a formula (7).

$$\beta_{km} = \begin{cases} 1 & (\varepsilon_{km} \in \theta) \\ 0 & (\varepsilon_{km} \notin \theta) \end{cases} \quad (7)$$

As a method for obtaining a best correspondence by using the formula (7), for example, there is a Hungarian method. It is possible to shorten a period of time necessary for performing the calculation processing by employing the Hungarian method. In addition, as a method for calculating the corresponding degree $\beta_{km}$, an appropriate calculation method other than the maximum value approximation method may be used.

The corresponding degree calculation unit 27 calculates the corresponding degree $\beta_{km}$ in such a way as described above.

The probability calculation unit 28 includes a function of calculating a probability (an existence probability) which represents whether or not the tracking target exists as an object to be correctly tracked, by using the corresponding degree $\beta_{km}$ calculated by the corresponding degree calculation unit 27. For example, it is assumed that the probability (the existence probability), in which the k-th tracking target exists as the object to be tracked, is $\eta_k$. In addition, when the k-th tracking target is newly registered into the information processing apparatus 20 as the tracking target, the existence probability $\eta_k$ is stored into the storage apparatus 22 or a memory device other than the storage apparatus 22 by the decision unit 30.

The probability calculation unit 28 calculates the existence probability $\eta_k$ by updating the existence probability $\eta_k$, which has been read out from the storage apparatus 22 or the memory device, in accordance with a formula (8).

$$\eta_k \leftarrow (1-\alpha)\eta_k + \hat{\eta}_k \quad (8)$$

Where the $\hat{\eta}$ in the formula (8) is a value obtained by using a formula (9). Further, the $\alpha$ represents a predetermined constant number.

$$\hat{\eta}_k = \sum_m \beta_{km} P_D^m \quad (9)$$

Where the $\beta_{km}$ in the formula (9) is the corresponding degree which is calculated by the corresponding degree calculation unit 27. The $P_D^m$ in the formula (9) represents, just like the aforementioned $P_D^m$, a probability that the m-th tracking candidate (detected object) is a correct answer (i.e., an object to be correctly detected).

The probability calculation unit 28 further includes a function of calculating a probability related to a tracking target which is temporarily in the state of being hidden. For example, it is supposed that a probability that the k-th tracking target is temporarily in the state of being hidden (a hiding probability) is $\xi_k$. In addition, the hiding probability $\xi_k$ is also stored into the storage apparatus 22 or a memory device other than the storage apparatus 22 by the decision unit 30, just like the existence probability $\eta_k$.

The probability calculation unit 28 calculates the hiding probability $\xi_k$ by updating the hiding probability, which has been read out from the storage apparatus 22 or the memory device other than the storage apparatus 22, in accordance with a formula (10).

$$\xi_k \leftarrow \xi_k + \delta_k \Delta \eta_k \quad (10)$$

The formula (10) is a formula which is derived in such a way as described below. For example, it is supposed that the k-th tracking target is hidden behind an object included in an image targeted for processing. In this case, the k-th tracking target exists within an area photographed in the image targeted for processing, but is not photographed (included) in the image. Further, the k-th tracking target has been determined as the object to be tracked based on an image having been photographed earlier than the image targeted for processing. Thus, the existence probability $\eta_k$ corresponding to the k-th tracking target is stored in the storage apparatus 22 or the memory device, as described above. When a value of the newly calculated existence probability Ilk has been reduced to a value smaller than the value of the existence probability Ilk stored in the storage apparatus 22 or the memory device (i.e., the value of the existence probability having been calculated last time), it can be inferred that the probability (the hiding probability) that the k-th tracking target is temporarily in the state of being hidden becomes high. Thus, in the formula (10), the hiding probability $\xi_k$ is updated (calculated) such that part of an amount of the reduction of the existence probability Ilk is given to the hiding probability $\xi_k$.

That is, the $\Delta \eta_k$ in the formula (10) represents a variation amount (an absolute value) of a variation of a newly calculated existence probability $\eta_k$ from the existence probability $\eta_k$ stored in the storage apparatus 22 or the memory device. The $\delta_k$ in the formula (10) represents a setting ratio for part of the $\Delta \eta_k$, which is given to the $\xi_k$. For example, the $\delta_k$ is a constant real number determined within a range from "0" to "1". Alternatively, a foreground is detected by using the background differencing technique, such as described in NPL 1, and a foreground ratio of an area, in which the tracking target is supposed to exist, to the detected foreground may be used as the $\delta_k$. A reason for this is that it can be considered that a probability of being in the state where the tracking target is hidden behind the foreground becomes higher as the foreground ratio becomes higher.

Further, a different index for determining whether or not the k-th tracking target is temporarily in the state of hidden may be obtained, and this index may be used as the $\delta_k$. Alternatively, if a position of an obstacle (the foreground) is already known, in the case where the tracking target comes to a position where the obstacle is supposed to exist, the $\delta_k$ may be set to a predetermined fixed value close to "1", otherwise, the $\delta_k$ may be set to a predetermined fixed value close to "0". Alternatively, the $\delta_k$ may be set to an externally inputted value. In this case, it becomes possible for a user to adjust the $\delta_k$ based on detection results so that a performance can be improved. In addition, in this case, the constant number $\alpha$ in the formula (8) may be made adjustable just like the $\delta_k$.

Meanwhile, there occurs a case where the existence probability $\eta_k$ increases to a value larger than a value having been obtained last time. In this case, the probability calculation unit 28 calculates the hiding probability $\xi_k$ in accordance with a formula (11).

$$\xi_k \leftarrow \xi_k - \frac{\xi_k}{1-\eta_k}\Delta\eta_k \quad (11)$$

That is, in the formula (11), the hiding probability $\xi_k$ is updated (calculated) by subtracting part of an increased portion of the existence probability $\eta_k$ from the hiding probability $\xi_k$ stored in the storage apparatus 22 or the memory device.

The inference unit 29 includes a function of inferring information (state information) representing a state of the tracking target. The state information is, for example, information which includes at least one of a position, a size, a moving speed and color information with respect to the tracking target. In addition, the state information related to the tracking target is fixed by the decision unit 30, and the fixed state information is stored into the storage device 22 or the memory device.

Specifically, the inference unit 29 acquires the corresponding degree having been calculated by the corresponding degree calculation unit 27. The inference unit 29 reads out the state information which is related to the tracking target and which is stored in the storage device 22 or the memory device. Further, the inference unit 29 infers the state of the tracking target in the image targeted for processing based on the above pieces of information by using a Karmann filter, a particle filter, or the like. Further, the inference unit 29 may infer the state information such that the k-th tracking target approaches the m-th tracking candidate with a priority in accordance with a weight of the probability $\beta_{km}$, as disclosed in NPL 4.

In addition, if the inference unit 29 uses the Karmann filter, the state information related to the tracking target includes variance value information related to the position of the tracking target. If the inference unit 29 uses the particle filter, the state information related to the tracking target includes particle information related to the tracking target.

The decision unit 30 includes a function of determining whether or not there exists any target (tracking target) to be newly tracked based on the information related to the corresponding degrees $\beta_{km}$ calculated by the corresponding degree calculation unit 27, the information related to the two kinds of the probability (the existence probability $\eta_k$ and the hiding probability $\xi_k$) calculated by the probability calculation unit 28, and the state information related to the tracking target inferred by the inference unit 29. Moreover, the decision unit 30 also includes a function of determining whether or not there exists any tracking target which may be deleted, by using the above pieces of information.

Specifically, for example, if the position of the k-th tracking target moves outside the area targeted for processing (for example, the image targeted for processing), the decision unit 30 determines the deletion of the k-th tracking target. If having determined that the sum of the existence probability $\eta_k$ corresponding to the k-th tracking target and the hiding probability $\xi_k$ corresponding to the k-th tracking target (this sum corresponding to an evaluation value) is smaller than or equal to a predetermined threshold value (a second threshold value) P1, the decision unit 30 determines the deletion of the k-th tracking target. If a state where the hiding probability $\xi_k$ corresponding to the k-th tracking target (this hiding probability corresponding to another evaluation value) is larger than or equal to a predetermined threshold value (a third threshold value) P2 continues for longer than or equal to a setting time T1, the decision unit 30 also determines the deletion of the k-th tracking target.

The decision unit 30 deletes a piece of information related to the k-th tracking target, the deletion of which has been determined in any one of the ways described above, from the storage apparatus 22 or the memory device.

In addition, a user may make a variable adjustment of the threshold values P1 and P2 and the setting time T1 in accordance with a status of processing on the image. For example, if setting any one or both of the threshold value P2 and the setting time T1 to a small value, the tracking target is likely to be deleted when the tracking target is temporarily in the state of being hidden, and thus, the number of tracking targets is reduced. In this way, an amount of information stored in the memory device is reduced. That is, setting the threshold value P2 and the setting time T1 in such a way as described above is effective when a storage capacity of the memory device is small.

Moreover, when having determined that there exists a tracking candidate for which the corresponding degrees $\beta_{km}$ corresponding to any one of the tracking targets are smaller than or equal to a predetermined threshold value (a first threshold value) P3, the decision unit 30 determines the tracking candidate as a new tracking target. Further, the decision unit 30 registers a piece of information related to the new tracking target into the storage apparatus 22 or a memory device other than the storage apparatus 22. In this case, as the existence probability and the hiding probability corresponding to the new tracking target, the decision unit 30 registers their respective predetermined fixed values. For example, specifically, in a case that a new tracking target is assumed to be an h-th tracking target, the existence probability $\eta_k$ corresponding to the h-th tracking target is set to 0.1, and the hiding probability $\xi_k$ corresponding to the h-th tracking target is set to 0.0.

Alternatively, the decision unit 30 calculates the existence probability and the hiding probability based on the probability that the tracking candidate (the detected object) is a target to be tracked (i.e., a tracking target), and registers the calculated values of the respective existence probability and hiding probability into the storage apparatus 22 or the memory device.

Moreover, the decision unit 30 includes a function of outputting information related to the latest tracking target having been obtained as the result of the determination described above to a predetermined output destination. Specifically, the decision unit 30 outputs, for each of the tracking targets, a combination of a piece of identification information (which is, for example, a piece of information representing how many tracking targets exist before the addition of the relevant tracking target), and coordinate values representing the position of the relevant tracking target position, as text based information.

Furthermore, the decision unit 30 includes a function of registering (updating) state information related to the tracking target having been fixed through the above-described decision processing into the storage device 22 or the memory device.

Figure 3:
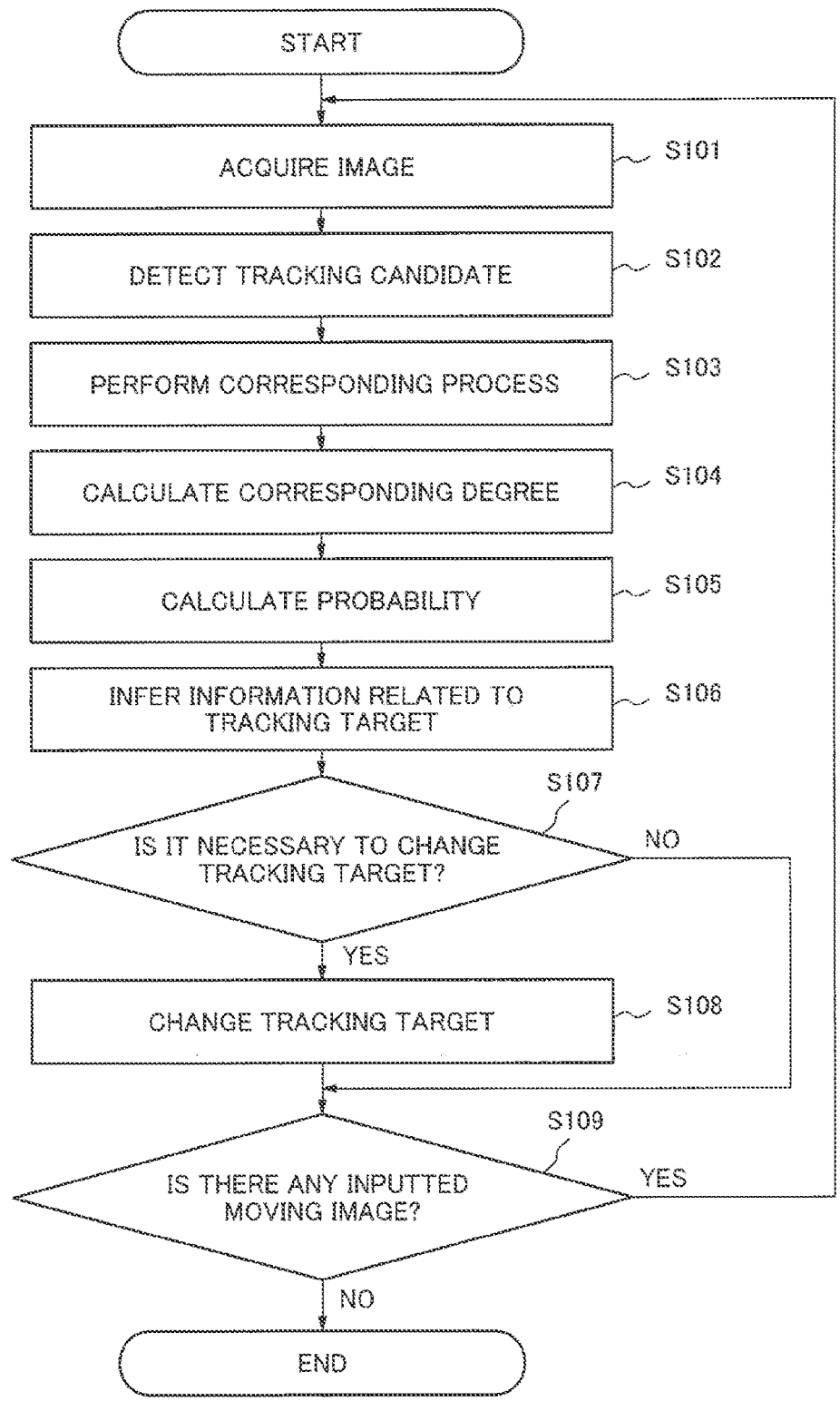
FIG. 3 is a flowchart illustrating a process procedure in the information processing apparatus according to the second exemplary embodiment of the present invention.

FIG. 3 is a flowchart illustrating a flow of processing performed by the information processing apparatus 20. This flowchart represents a process procedure of a computer program executed by the control apparatus 21 in the information processing apparatus 20 of this second exemplary embodiment.

For example, when input of a moving image begins, the control apparatus 21 (the acquisition unit 25) acquires one image (one image targeted for processing) from the moving image (step S101).

Next, the control apparatus 21 (the detection unit 26) detects the tracking candidate from the acquired image by means of image processing (step S102). The image is given a mark representing a tracking candidate. The mark is of, for example, a rectangular shape or an elliptical shape, and it is possible to allow the center position of the mark to indicate the center position of the tracking candidate, and allow the size of the mark to indicate the size of the tracking candidate. In addition, the shape of the mark is not limited to the rectangular shape and the elliptical shape.

Next, the control apparatus 21 (the corresponding degree calculation unit 27) reads out information related to the tracking target stored in the storage device 22 or the memory device, and performs corresponding processing to relate the relevant tracking target to the tracking candidate included in the image targeted for processing (step S103). Moreover, the control apparatus 21 (the corresponding degree calculation unit 27) calculates the corresponding degree $\beta_{km}$ representing the degree of a correspondence relation between the tracking targets and the tracking candidate (step S104).

Next, the control apparatus 21 (the probability calculation unit 28) calculates the existence probability $\eta_k$ and the hiding probability $\xi_k$ (step S105). Subsequently, the control apparatus 21 (the inference unit 29) infers a state of the tracking target by using pieces of information related to the calculated corresponding degree $\beta_{km}$ and the like (step S106).

Subsequently, the control apparatus 21 (the decision unit 30) determines whether or not it is necessary to change the tracking target (step S107). Further, in a case of determining that it is necessary to change the tracking target, the control apparatus 21 deletes information related to tracking target which, as the result of a determination made by the control apparatus 21, does not exist in an area photographed in the image, from the storage apparatus 22 or the memory device, or the control apparatus 21 registers information related to the tracking target which, as the result of a determination made by the control apparatus 21, has come to a state of newly existing in the image, into the storage apparatus 22 or the memory device (step S108).

Subsequently, the control apparatus 21 determines whether or not a moving image is inputted (step S109). Meanwhile, after having determined that it is unnecessary to change the tracking target in step S107, the control apparatus 21 also carries out the processing of step S109. Further, in a case of determining that another moving image is inputted, the control apparatus 21 repeats the processes of step S101 and subsequent steps. In a case of determining that no moving image is inputted, the control apparatus 21 terminates this processing related to the object tracking.

In this second exemplary embodiment, as described above, the information processing apparatus 20 (the control apparatus 21) calculates the corresponding degree $\beta_{km}$ between the tracking target and the tracking candidate by taking into consideration a probability that the tracking target is an object to be correctly tracked. In this way, the information processing apparatus 20 enables early removal of an object unnecessary to be tracked from the tracking target and, simultaneously therewith, in a case that the tracking target is temporarily in the state of being not detected, the information processing apparatus 20 enables continuous tracking of the relevant tracking target without removing it from the tracking target.

In contrast, in NPL 4, a probability P(θ) that the tracking candidate is likely to correspond to the tracking target is calculated based on a following formula.

P(θ)∝(a probability that, in θ, the tracking candidate is an object to be correctly tracked)×(a probability that the tracking candidate is an object which is not included in θ and has been erroneously detected)×(a probability that the tracking candidate, which is not included in θ, is not detected as the tracking target)×(a degree of proximity between the tracking target and the corresponding tracking candidate in θ) . . . .(12)

A specific mathematical formula corresponding to the formula (12) can be represented by a formula (13).

$$P(\theta) \approx \prod_{m \in U(\theta)}^{N_D} P_D^m \times \prod_{m \notin U\theta}^{M-N_D} (1 - P_D^m) \times Q^{K-N_D} \times \prod_{\varepsilon_{km} \in \theta} q_{km} \qquad (13)$$

The probability P(θ) calculated based on the formula (13) is a probability on the assumption that the tracking target is an object to be correctly tracked. That is, in NPL 4, a case where the tracking target which is not an object to be correctly tracked is not taken into consideration.

In contrast, in this second exemplary embodiment, as described above, the control apparatus 21 calculates a probability P(θ) by additionally taking into consideration a case where the tracking target is not an object to be correctly tracked. In this way, it is possible to obtain advantageous effects that the control apparatus 21 enables early removal of the not-to-be-tracked tracking target from the tracking target and, simultaneously therewith, in the case that the tracking target is temporarily in the state of being hidden, the control apparatus 21 enables continuous tracking of the tracking target.

(Third Exemplary Embodiment)

Hereinafter, a third exemplary embodiment according to the present invention will be described.

Figure 5:
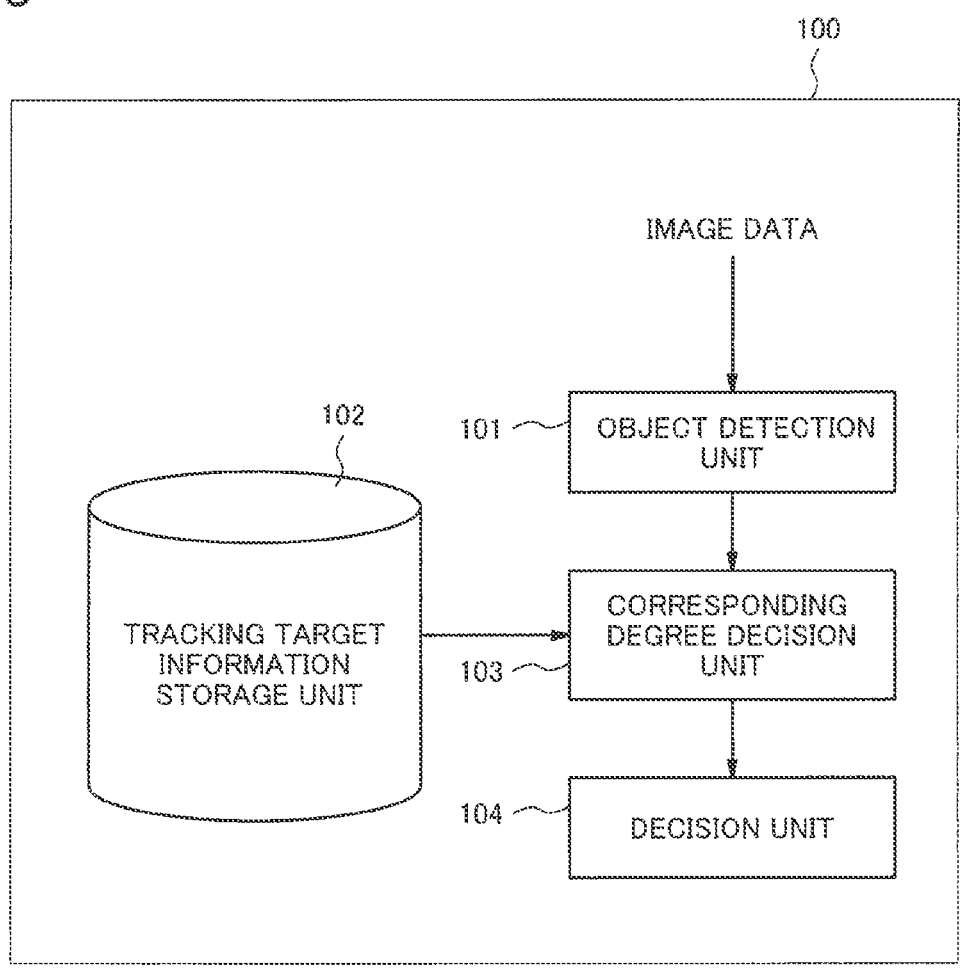
FIG. 5 is a block diagram illustrating a simplified configuration of an information processing apparatus according to a third exemplary embodiment of the present invention.

FIG. 5 is a block diagram illustrating a simplified configuration of an information processing apparatus 100 of this third exemplary embodiment. This information processing apparatus 100 is an apparatus for tracking a target object in an image. The information processing apparatus 100 includes an object detection unit (detection means) 101, a tracking target information storage unit 102, a corresponding degree decision unit (corresponding degree calculation means) 103 and a decision unit (decision means) 104.

The object detection unit 101 includes a function of detecting an object included in an image. The tracking target information storage unit 102 stores therein information related to the tracking target. Further, the corresponding degree decision unit 103 decides the corresponding degree between the object (tracking candidate) detected by the object detection unit 101 and tracking target. The decision unit 104 includes a function of a determination using the corresponding degree as to whether or not the tracking candidate is a tracking target, whether or not the tracking target is temporarily in the state of being hidden, and whether or not information related to the tracking target is to be deleted from the storage unit 102.

In this third exemplary embodiment, it is also possible to obtain the same advantageous effects as those of the second exemplary embodiment.

(Fourth Exemplary Embodiment)

Hereinafter, a fourth exemplary embodiment according to the present invention will be described.

FIG. 6 is a block diagram illustrating a simplified configuration of an information processing apparatus of this fourth exemplary embodiment. An information processing apparatus 200 includes a function of inferring a current position of an object in the state of being tracked. In the inference, the information processing apparatus 200 detects the position of the object from a moving image at each time point by means of object detection processing, and takes into consideration the result of the detection as well as proximity with past positions of the object in the state of being tracked. For example, in a moving image photographed by a fixed camera, sometimes, there occurs a case where the object targeted for tracking, such as persons or vehicles, disappear to the outside of the image, or newly enter into the inside of the image. That is, there occurs a variation with respect to the object targeted for tracking in the moving image. The information processing apparatus 200 of this fourth exemplary embodiment is configured so as to be capable of correctly tracking the object targeted for tracking even the case that the status of the object targeted for tracking varies.

That is, the information processing apparatus 200 includes an acquisition unit 211, a detection unit (detection means) 212, a corresponding processing unit (corresponding degree calculation means) 213, a calculation unit 214, an update unit 215, an addition and deletion unit (decision means) 216, an output unit 217, a tracking target storage unit 221 and a probability storage unit 222. In a case that the information processing apparatus 200 is realized by a computer, a CPU executes a computer program corresponding to each of the above component units 211 to 217, and thereby, those component units 211 to 217 are realized.

The acquisition unit 211 includes a function of newly acquiring one image from a moving image inputted from a camera.

The detection unit 212 includes a function of detecting the candidate (the tracking candidate), which is an object targeted for tracking, from the image having been acquired by the acquisition unit 211 by means of image processing for detecting the object. There are a large number of methods (object detection method) for detecting the object, and here, any one of the methods may be employed. For example, the detection unit 212 carries out the object detection method using a background differencing technique such as disclosed in NPL 1. Alternatively, the detection unit 212 may carry out the other object detection method based on the learning (mechanical learning) in relation to the tracking target performing in advance, such as disclosed in NPL 2. In addition, sometimes, a mark of a rectangular shape is used as a mark indicating a detection area within the image, but, just like in the case of the second exemplary embodiment, the mark is not needed to be of a rectangular shape, and it may be of, for example, an elliptical shape or a more complicated shape.

The corresponding processing unit 213 includes a function of calculating the corresponding degree with respect to the tracking candidate detected by the detection unit 212, by using the tracking target information stored in the tracking target storage unit 221 and probability values stored in the probability storage unit 222. For example, the corresponding processing unit 213 calculates the corresponding degree just like the corresponding degree calculation unit 27 in the second exemplary embodiment.

The calculation unit 214 includes a function of calculating a probability (an existence (real existence) probability) which represents whether or not the tracking target really exists as the object to be correctly tracked, by using the calculation result obtained by the corresponding processing unit 213. Moreover, the calculation unit 214 also includes a function of calculating a probability that the tracking target is temporarily in the state of being hidden. Specifically, for example, the calculation unit 214 calculates this probability just like the probability calculation unit 28 in the second exemplary embodiment.

The update unit 215 includes a function of updating a state of the tracking target by using the corresponding operation result obtained by the corresponding processing unit 213. The state of a tracking target includes, for example, a position, a size, a moving speed and color information with respect to the tracking target in the image. The update unit 215 performs update processing using, for example, a Karmann filter or a particle filter.

The addition and deletion unit 216 includes a function of determining whether or not there exists a target to be newly tracked, by using the result of the corresponding operation performed by the corresponding processing unit 213, the existence (real existence) probabilities calculated by the calculation unit 214 and the state of tracking target, updated by the update unit 215. Moreover, the addition and deletion unit 216 also includes a function of determining whether or not the registered tracking target is to be deleted. Furthermore, the addition and deletion unit 216 includes a function of newly registering the tracking target into the tracking target storage unit 221 and deleting information related to the tracking target from the tracking target storage unit 221 based on the above-described determination results. Specifically, the addition and deletion unit 216 carries out the same processing as the processing for registration and deletion of the tracking target, performed by the decision unit 30 in the second exemplary embodiment.

The output unit 217 includes a function of outputting information (for example, text-based information) which is related to the tracking target and is obtained from the addition and deletion unit 216.

The tracking target storage unit 221 is a storage area in which the state of the tracking target is stored. For example, the tracking target storage unit 221 stores a combination of information representing how many the tracking targets there exist before the addition of the relevant tracking target and information representing a state of the relevant added tracking target.

The probability storage unit 222 is an area in which an existence (real existence) probability of the tracking target and a probability that the tracking target is temporarily in the state of being hidden are stored. For example, for each of tracking targets, these kinds of probability are combined and stored into the probability storage unit 222 in the state of being correlated with information related to the relevant tracking target.

Figure 7:
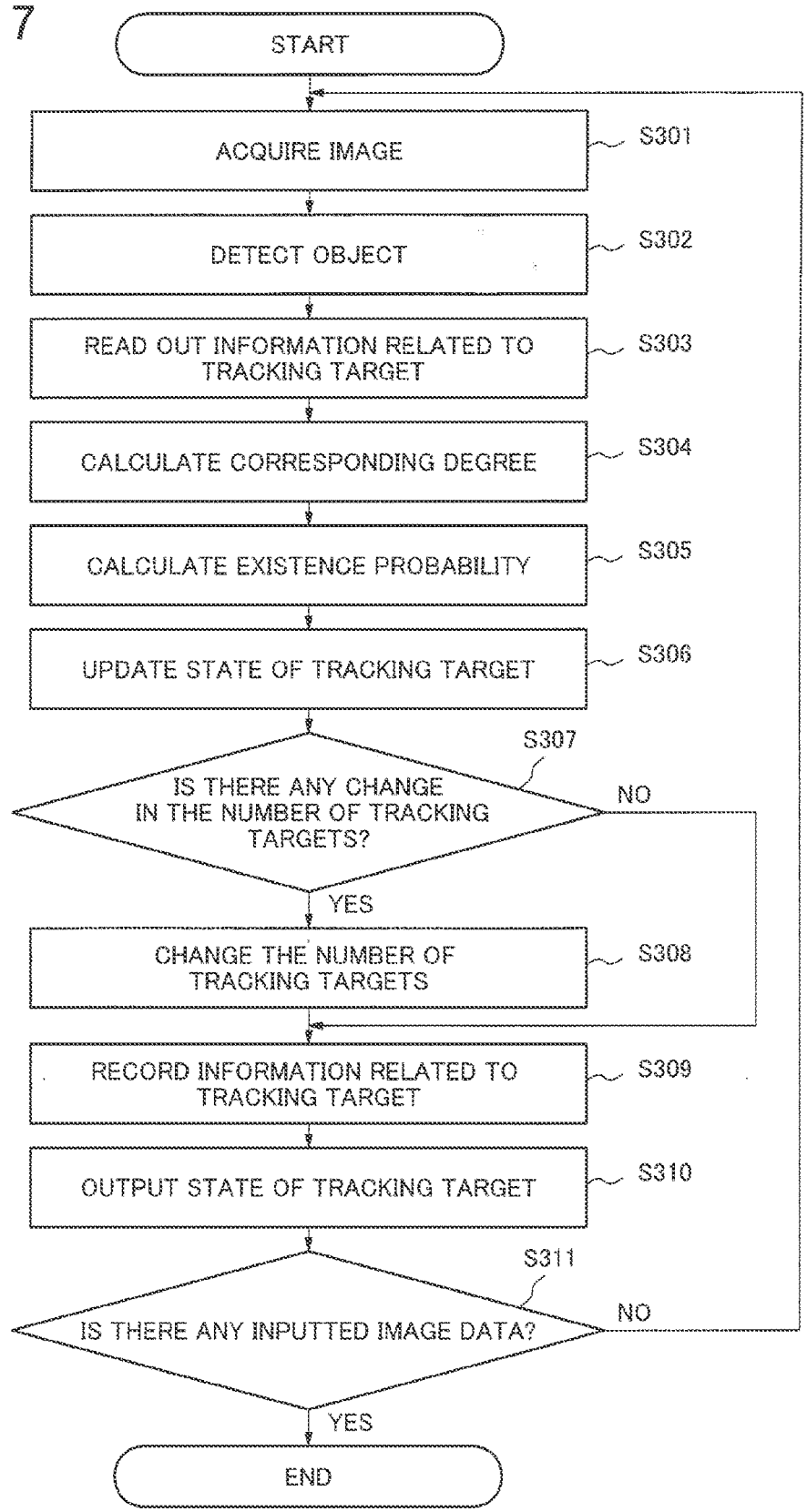
FIG. 7 is a flowchart illustrating a process procedure in the information processing apparatus according to the fourth exemplary embodiment of the present invention.

FIG. 7 is a flowchart illustrating a process procedure of the information processing apparatus 200 of the fourth exemplary embodiment. Operation of the information processing apparatus 200 will be described by using this FIG. 7.

First, the acquisition unit 211 newly acquires one image from the moving image, such as a picture inputted from a camera (step S301).

Next, the detection unit 212 carries out the object detection processing to the input image having been inputted in step S301. Through this process, the detection unit 212 obtains the tracking candidate (step S302). As the mark representing the tracking candidate, specifically, the mark of a rectangular shape is used. Through this mark, the center position of the tracking candidate and size information related thereto, such as information related the width thereof and information related to the height thereof, are acquired. Further, with respect to the shape of the mark, as substitute for a rectangular shape, a different shape, such as an elliptical shape, may be employed.

Next, the corresponding processing unit 213 reads out the information related to the tracking target, stored in the tracking target storage unit 221, and the information related to the tracking target, stored in the probability storage unit 222 (step S303). The corresponding processing unit 213 performs corresponding processing for relating the tracking candidate to the tracking target, and further, calculates the corresponding degree (step S304).

Next, the calculation portion 214 calculates the existence (real existence) probability with respect to the tracking target based on the corresponding degree having been calculated by the corresponding processing unit 213 and a calculation formula which is given in advance (step S305). Next, the update unit 215 updates the state of the tracking target (step S306).

Next, the addition and deletion unit 216 determines whether or not there exists any change in the number of the tracking targets (step S307). Further, in the case where there exists any change in the number of the tracking targets, the addition and deletion unit 216 updates the number of the tracking targets (step S308). Subsequently, the addition and deletion unit 216 records the latest information related to the tracking target into the tracking target storage unit 221 and the probability storage unit 222 (step S309). In the case where there exists no change in the number of the tracking targets, the addition and deletion unit 216 causes the process flow to proceed to step S309 without performing any processing.

Next, the output unit 217 outputs the latest state of the tracking target (step S310).

Subsequently, the information processing apparatus 200 determines whether or not there exists any image to be newly acquired from the moving image, such as a picture inputted from a camera. (step S311). Further, in the case where there exists any new image, the information processing apparatus 200 repeats the processes of step S301 and subsequent steps. In contrast, in the case where there exists no new image, the information processing apparatus 200 terminates the processing.

In this fourth exemplary embodiment, the same advantageous effects as those of each of the second and third exemplary embodiments can be also obtained.

(Other Exemplary Embodiments)

It is to be noted here that the present invention is not limited to the aforementioned first to fourth exemplary embodiments, and the present invention can adopt various exemplary embodiment.

For example, an information processing apparatus of another exemplary embodiment (1) includes:

object detection means for detecting an object included in an image;

storage means for storing information related to a tracking target to be target object for tracking;

corresponding degree decision means for deciding a corresponding degree between the detected object detected by the object detection means and the tracking target; and decision means for, by using the corresponding degree, determining whether or not the detected object is the tracking target, whether or not the tracking target is temporarily in a state of being hidden, and whether or not the information related to the tracking target is to be deleted from the storage means.

An information processing apparatus of another exemplary embodiment (2) includes the configuration of the information processing apparatus of another exemplary embodiment (1), further includes:

the corresponding degree decision means decides the corresponding degree such that a first corresponding degree is larger than a second corresponding degree, the first corresponding degree is associated with the tracking target having higher probability to be correctly tracked, the second corresponding degree is associated with the tracking target having lower probability to be correctly tracked.

An information processing apparatus of another exemplary embodiment (3) includes the configuration of the information processing apparatus of another exemplary embodiment (2), further includes:

the corresponding degree includes a first probability that an object to be correctly tracked is detected as the tracking target by the object detection means, and a second probability that the object to be correctly tracked is not detected as the tracking target by the object detection means.

An information processing apparatus of another exemplary embodiment (4) includes the configuration of the information processing apparatus of another exemplary embodiment (3), further includes:

the corresponding degree decision means decides that a possibility of being a state where observation is difficult is high in a case that the first probability becomes low after becoming high, and cause the second probability to increase by an amount equal to an amount of the decrease of the first probability.

An information processing apparatus of another exemplary embodiment (5) includes the configuration of the information processing apparatus of another exemplary embodiment (4), further includes:

the corresponding degree decision means includes adjustment mean for adjusting an amount of increase of the second probability in accordance with an amount of decrease of the first probability.

An information processing apparatus of another exemplary embodiment (6) includes the configuration of the information processing apparatus of another exemplary embodiment (3) or the information processing apparatus of another exemplary embodiment (4), further includes deletion means for deleting the information related to the tracking target that a sum of the first probability and the second probability is smaller than or equal to a predetermined threshold value.

An information processing apparatus of another exemplary embodiment (7) includes the configuration of the information processing apparatus of another exemplary embodiment (6), further includes:

deleting the information related to the tracking target by the deletion means is performed in a case that a period during which the second probability is larger than or equal to a predetermined threshold value continues longer than or equal to a predetermined period of time.

An object tracking method of another exemplary embodiment (8) includes:

detecting an object included in an image;

deciding, by using information which is stored in storage means and which is related to a tracking target to be target object for tracking, a corresponding degree between the detected object and the tracking target; and deciding, by using the corresponding degree, whether or not the detected object is the tracking target, whether or not each of the at least one tracking target object is temporarily in a state of being hidden, and whether or not the information related to each of the at least one tracking target object is to be deleted from the storage means.

A program storage medium of another exemplary embodiment (9) stores a computer program that causes a computer to execute processing including the processes of:

deciding, by using information which is stored in storage means and which is related to a tracking target to be target object for tracking, a corresponding degree between the detected object and the tracking target; and deciding, by using the corresponding degree, whether or not the detected object is the tracking target, whether or not each of the at least one tracking target object is temporarily in a state of being hidden, and whether or not the information related to each of the at least one tracking target object is to be deleted from the storage means.

In addition, in each of the aforementioned exemplary embodiments according to the present invention, although it is described that the individual functions of the information processing apparatus are realized by a computer program (software), the present invention may be configured such that part of the computer program is realized by hardware.

Further, the information processing apparatus of the first exemplary embodiment may include the same storage medium as the storage medium 23 according to the second exemplary embodiment. This storage medium stores therein a computer program (a program) which represents a process procedure of the detection unit 2, the corresponding degree calculation unit 3 and the decision unit 4. The detection unit 2, the corresponding degree calculation unit 3 and the decision unit 4 are each realized by, for example, causing a computer (a CPU) to read out the program from the storage medium and execute the program.

Moreover, the present invention may be applied to a system constituted of a plurality of devices, and it may be applied to a single apparatus. Furthermore, the present invention can be applied when a computer program which realizes the functions of the present invention is supplied to a system or an apparatus directly or from a remote location. That is, the present invention can be also applied to a World Wide Web (WWW) server which supplies the program from a remote location.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2011-158340, filed on Jul. 19, 2011, the disclosure of which is incorporated herein in its entirety by reference.

INDUSTRIAL APPLICABILITY

With respect to the technology for detecting a moving object, such as person and vehicle, and tracking the moving object, the application of the present invention to various fields is highly expected.

REFERENCE SIGNS LIST 1, 20 and 200: Information processing apparatus
2 and 26: Detection unit
3 and 27: Corresponding degree calculation unit
4 and 30: Decision unit

The invention claimed is:

1. An information processing apparatus comprising:
memory storing instructions, and
a processor configured to execute the instructions to:
detect an object included in an image as a tracking candidate by image processing;
calculate a corresponding degree representing a probability that the tracking candidate corresponds to a tracking target registered as an object to be tracked;
determining an evaluation value based on the calculated corresponding degree and at least one of an existence probability and a hiding probability, wherein the evaluation value represents a necessity of continuously tracking the tracking target, the existence probability represents a degree of certainty that the tracking target is in a state of being detected, and the hiding probability represents a degree of certainty that the tracking target is temporarily in a state of being not detected; and
delete a registration of the object to be tracked with respect to the relevant tracking target when the evaluation value indicates that it is unnecessary to track the tracking target.

2. The information processing apparatus according to claim 1, wherein the processor newly registers, as the object to be tracked, the tracking candidate for which the corresponding degree to the tracking target is smaller than or equal to a first threshold value.

3. The information processing apparatus according to claim 1, wherein the processor is further configured to execute the instructions to detect the tracking candidate every time the image is acquired from a moving image, and calculate the corresponding degree every time the tracking candidate is detected, wherein the existence probability and the hiding probability are calculated every time the corresponding degree is calculated, and a temporal variation in the existence probability and a temporal variation in the hiding probability is reverse to each other in an increasing and decreasing direction.

4. The information processing apparatus according to claim 1, wherein the processor is further configured to execute the instructions to delete the tracking target, for which it is determined that a sum of the existence probability and the hiding probability is smaller than or equal to a second threshold value, from the registration as the object to be tracked.

5. The information processing apparatus according to claim 1, wherein the processor is further configured to execute the instructions to delete the tracking target, for which it is determined that a state in which the hiding probability is larger than or equal to a third threshold value has been continuing for a period longer than a predetermined period of time, from the registration as the object to be tracked.

6. The information processing apparatus according to claim 3, wherein, in a case that the existence probability varies in a temporally decreasing direction, the hiding probability is calculated by adding an amount equal to a setting ratio of the temporal variation of the existence probability to a hiding probability that was calculated previously.

7. The information processing apparatus according to claim 6, wherein the setting ratio which is used in the case of calculating the hiding probability is an externally inputted value.

8. A method for tracking an object, comprising:
detecting, by a computer, an object included in an image as a tracking candidate by image processing;
calculating, by the computer, a corresponding degree representing a probability that the detected tracking candidate corresponds to a tracking target registered as an object to be tracked;
determining, by the computer, an evaluation value based on the calculated corresponding degree and at least one of an existence probability and a hiding probability, wherein the evaluation value represents a necessity of continuously tracking the tracking target, the existence probability represents a degree of certainty that the tracking target is in a state of being detected, and the hiding probability represents a degree of certainty that the tracking target is temporarily in a state of being not detected; and
deleting, by the computer, a registration of the object to be tracked with respect to the relevant tracking target when the evaluation value indicates that it is unnecessary to track the tracking target.

9. A non-transitory computer readable storage medium storing a computer program that causes a computer to execute processing comprising the processes of:
   detecting an object included in an image as a tracking candidate by image processing;
   calculating a corresponding degree representing a probability that the detected tracking candidate corresponds to a tracking target registered as an object to be tracked;
   determining an evaluation value based on the calculated corresponding degree and at least one of an existence probability and a hiding probability, wherein the evaluation value represents a necessity of continuously tracking the tracking target, the existence probability represents a degree of certainty that the tracking target is in a state of being detected, and the hiding probability represents a degree of certainty that the tracking target is temporarily in a state of being not detected; and
   deleting a registration of the object to be tracked with respect to the relevant tracking target when the evaluation value indicates that it is unnecessary to track the tracking target.

* * * * *